(12) United States Patent
Wee

(10) Patent No.: US 6,631,262 B1
(45) Date of Patent: Oct. 7, 2003

(54) METHOD FOR UPDATING SECTOR LIST OF HOME ZONE DATABASE FOR HOME ZONE SERVICE

(75) Inventor: Pyeong-Hwan Wee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 505 days.

(21) Appl. No.: 09/691,367

(22) Filed: Oct. 18, 2000

(30) Foreign Application Priority Data

Oct. 19, 1999 (KR) .............................................. 99-45330

(51) Int. Cl.$^7$ .............................. H04Q 7/20; H04Q 7/34
(52) U.S. Cl. ........................ 455/433; 455/456; 455/457; 455/560; 455/422; 370/328
(58) Field of Search .................................. 455/433, 406, 455/407, 408, 432, 69, 522, 561, 560, 412, 403, 422, 456, 457, 67.1, 423, 424, 425, 67.3; 370/328

(56) References Cited

U.S. PATENT DOCUMENTS

| | | | | |
|---|---|---|---|---|
| 5,212,830 A | * | 5/1993 | Miller | 455/422 |
| 5,983,108 A | * | 11/1999 | Kennedy, III et al. | 455/456 |
| 6,101,390 A | * | 8/2000 | Jayaraman et al. | 455/456 |
| 6,236,365 B1 | * | 5/2001 | Leblanc et al. | 455/456 |

* cited by examiner

*Primary Examiner*—William Trost
*Assistant Examiner*—Keith Ferguson
(74) *Attorney, Agent, or Firm*—Cha & Reiter

(57) ABSTRACT

A method for adding to a sector list substitute information about a sector excluded from the sector list due to low strength of a corresponding PN signal transmitted from a base station. The coordinates of adjacent bins relative to the location of the mobile user are searched and tabulated, then the sector information of adjacent bins are retrieved and added to the sector list of a mobile station.

15 Claims, 4 Drawing Sheets

| No | EMPTY COORDINATE | REMARKS |
|---|---|---|
| 1 | $(2x_0, 0)$ | THIS BIN EXISTS ON X-AXIS, HAVING POSITIVE X-AXIS VALUE |
| 2 | $(2x_0, 2y_0)$ | THIS BIN EXISTS ON 1ST QUADRANT |
| 3 | $(0, 2y_0)$ | THIS BIN EXISTS ON Y-AXIS, HAVING POSITIVE Y-AXIS VALUE |
| 4 | $(-2x_0, 2y_0)$ | THIS BIN EXISTS ON 2ND QUADRANT |
| 5 | $(-2x_0, 0)$ | THIS BIN EXISTS ON X-AXIS, HAVING NEGATIVE X-AXIS VALUE |
| 6 | $(-2x_0, -2y_0)$ | THIS BIN EXISTS ON 3RD QUADRANT |
| 7 | $(0, -2y_0)$ | THIS BIN EXISTS ON Y-AXIS, HAVING NEGATIVE Y-AXIS VALUE |
| 8 | $(2x_0, -2y_0)$ | THIS BIN EXISTS ON 4TH QUADRANT |

FIG. 3

| No | POSITION IN SUBSCRIBER'S BIN (FIG. 1) | ADJACENT BIN NUMBER TO BE USED |
|---|---|---|
| 1 | THIS BIN EXSTS ON X-AXIS, HAVING POSITIVE X-AXIS VALUE | 1 |
| 2 | THIS BIN EXSTS ON 1ST QUADRANT | 1,2,3 |
| 3 | THIS BIN EXSTS ON Y-AXIS, HAVING POSITIVE Y-AXIS VALUE | 3 |
| 4 | THIS BIN EXSTS ON 2ND QUADRANT | 3,4,5 |
| 5 | THIS BIN EXSTS ON X-AXIS, HAVING NEGATIVE X-AXIS VALUE | 5 |
| 6 | THIS BIN EXSTS ON 3RD QUADRANT | 5,6,7 |
| 7 | THIS BIN EXSTS ON Y-AXIS, HAVING NEGATIVE Y-AXIS VALUE | 7 |
| 8 | THIS BIN EXSTS ON 4TH QUADRANT | 7,8,1 |

FIG. 4

METHOD FOR UPDATING SECTOR LIST OF HOME ZONE DATABASE FOR HOME ZONE SERVICE

CLAIM OF PRIORITY

This application claims priority to an application entitled "Method for Updating Sector List of Home Zone Database for Home Zone Service" filed in the Korean Industrial Property Office on Oct. 19, 1999 and assigned Serial No. 99-45330.

BACKGROUND OF THE INVENTION

1. Field of the Invention

The present invention relates generally to a method for providing a home zone service in a mobile communication system. More particularly, the present invention relates to a method for updating the sector list of a home zone database used for the home zone service.

2. Description of the Related Art

A home zone service allocates a specific area, called a home zone, to the subscriber of the mobile telephone. Depending on whether the mobile user makes a call connection within the home zone, a lesser charge rate is applied for a call connection made within this home zone.

If a mobile subscriber has requested the home zone service, designating his or her residence as the home zone, then the service provider may waive the connection charge or apply a lower charge rate that is equivalent to a wired call connection if the subscriber makes a call connection within the residence. Otherwise, a normal charge rate will be applied to the call connection made outside his or her home.

As the coverage area of a cell can be divided into a plurality of sectors, a sector information is used to more narrowly define the home zone. That is, a particular sector coverage area can be designed as the home zone. Thus, a sector list for the home zone service is represented in the unit of a bin, defining a particular home zone. However, the reliability of the sector list, which is collected using a Pseudo Noise (PN) signal strength to define a particular home zone, depends on the multipath characteristics of the surrounding environment. Thus, in the process of generating a sector list, a particular sector that should be included in the sector list can be excluded if the corresponding Pseudo Noise (PN) signal strength is affected by the multipath characteristics, such as a building and other structures.

SUMMARY OF THE INVENTION

It is, therefore, an object of the present invention to provide a method for adding, to a sector list, substitute information about a particular sector excluded from the sector list due to the corresponding low PN signal strength.

The object of the present invention is to provide a method for updating and managing a sector list in the event that a particular sector information is excluded due to the multipath characteristics, by fetching adjacent sector information.

In the present invention, a given sector is defined in the unit of a bin, wherein the bin is defined by the latitude and longitude of a two-dimensional coordinate system.

To achieve the above and other objects, the coordinates of adjacent bins are initially searched and the corresponding sector information of adjacent bins are included in the sector list if a particular bin is excluded from the sector list due to the multipath characteristics of the radio environment.

BRIEF DESCRIPTION OF THE DRAWINGS

The above and other objects, features, and advantages of the present invention will become more apparent from the following detailed description when taken in conjunction with the accompanying drawings in which:

FIG. 3 is a diagram illustrating coordinates of 8 bins adjacent to the bin in which the subscriber is included, as shown in FIG. 2; and, FIG. 4 is a diagram illustrating a bin list that is used when updating and managing the sector list by the subscriber unit.

DETAILED DESCRIPTION OF THE PREFERRED EMBODIMENT

A preferred embodiment of the present invention will be described herein below with reference to the accompanying drawings. For the purpose of clarity, well-known functions or constructions are not described in detail since they would obscure the invention in unnecessary detail.

Figure 1:
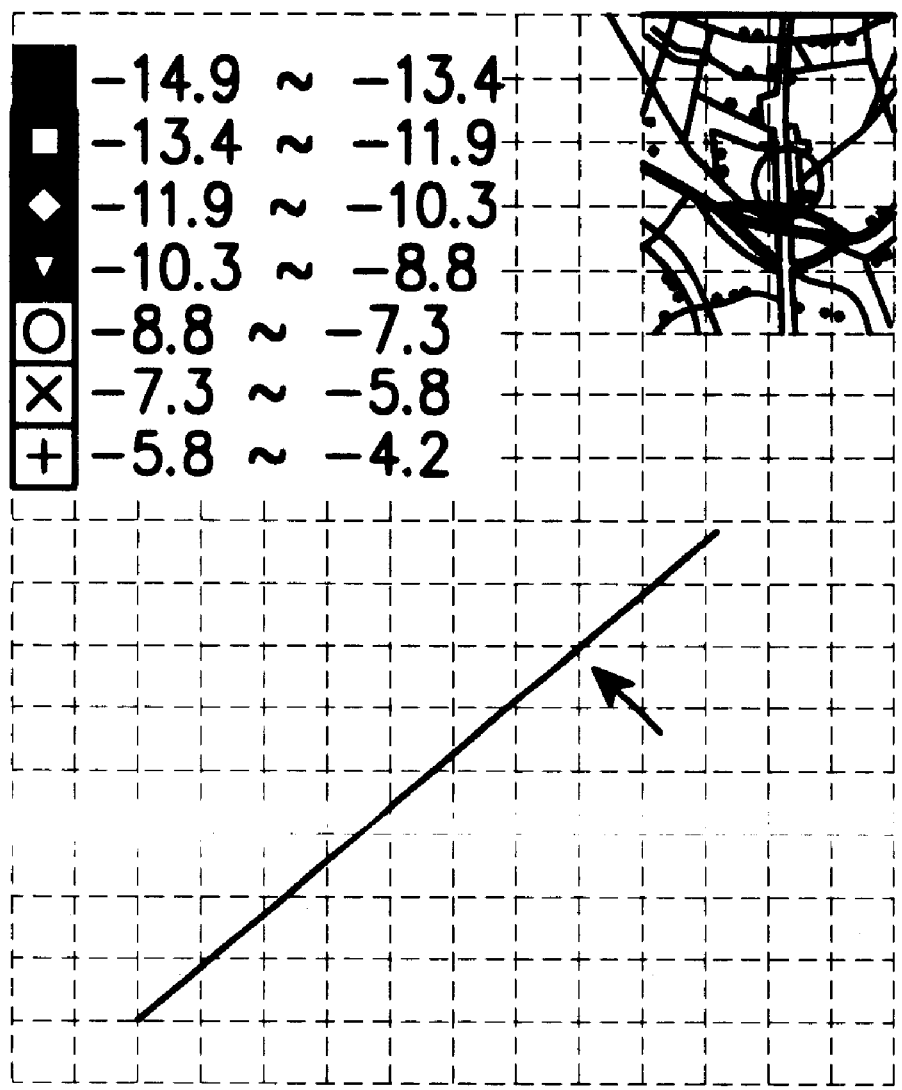
FIG. 1 is a diagram illustrating a field test result performed relating to the Ec/Io ratio respect to a base station located in a given area.

FIG. 1 illustrates a field test result performed to measure the Ec/Io of a base station located in a particular area. Many residential districts are distributed over the surrounding areas of the base station and the morphology in the vicinity of the base station is similar to an urban area.

With regard to a test route, the Ec/Io of a mobile station along the radial direction, as the mobile station travels away from the stationary base station, is measured to determine the maximum coverage radius of the base station.

As the mobile station travels away from the base station, the base station signal strength received at the mobile station is reduced. In practice, such detection is performed using testing equipment, which displays different colors to indicate the levels of the receiving signal strength. For example, as the signal strength received from the base station fades when the mobile station travels away from the base station, the signal strength indicating light changes from light green to blue and orange. During the process of measuring the signal strength to generate a sector list, occasionally, the signal strength becomes low or undetectable even though the mobile station is located very close to the base station. Such a phenomenon occurs due to the geographical properties or the structure of the buildings that interfere with the receiving signal path between the base station and the mobile station.

In defining a particular home zone service, the Ec/Io is actually collected using actual measurements obtained from the real working condition. Normally, a home zone can be defined through a binning process. However, it is not possible to measure the Ec/Io for every bin representing the home zone service area due to above-mentioned multipath characteristics. In such a case, each sector list is created by obtaining the Ec/Io measured on the neighboring bins according to the present invention. Yet, if the first measured Ec/Io is low or undetectable, as shown by the arrow of FIG. 1, a particular bin may be excluded from the sector list since the PN signal strength is unascertainable due to the multipath characteristics. As a result, the mobile subscriber making a call connection within the fading problem area is unable to benefit lower charge rate. In order to address this problem, the present invention provides a means to provide an alternative/substitute information by fetching sector list information included in the adjacent bins.

To obtain information of adjacent bins when a particular bin information is unascertainable, the latitude and the longitude of a bin where the subscriber is located are first obtained from the latitude and the longitude information from a database, which contains a predetermined latitude/longitude bin data corresponding to each address in the system. Thus, when the subscriber's position is extracted thorough the address information sent by the subscriber, a sector list of the corresponding bin data is obtained from a predetermined zone data. At this point, the present invention is designed to fetch the sector list information of the adjacent bin from the zone data. When fetching the adjacent bin information, the following conditions have to be satisfied:

(Condition 1) The latitude/longitude information corresponding to the subscriber's address should be correct.

(Condition 2) The latitude/longitude information of the bin where the subscriber is included and obtained from the extracted subscriber's latitude/longitude data should be correct.

Figure 2:
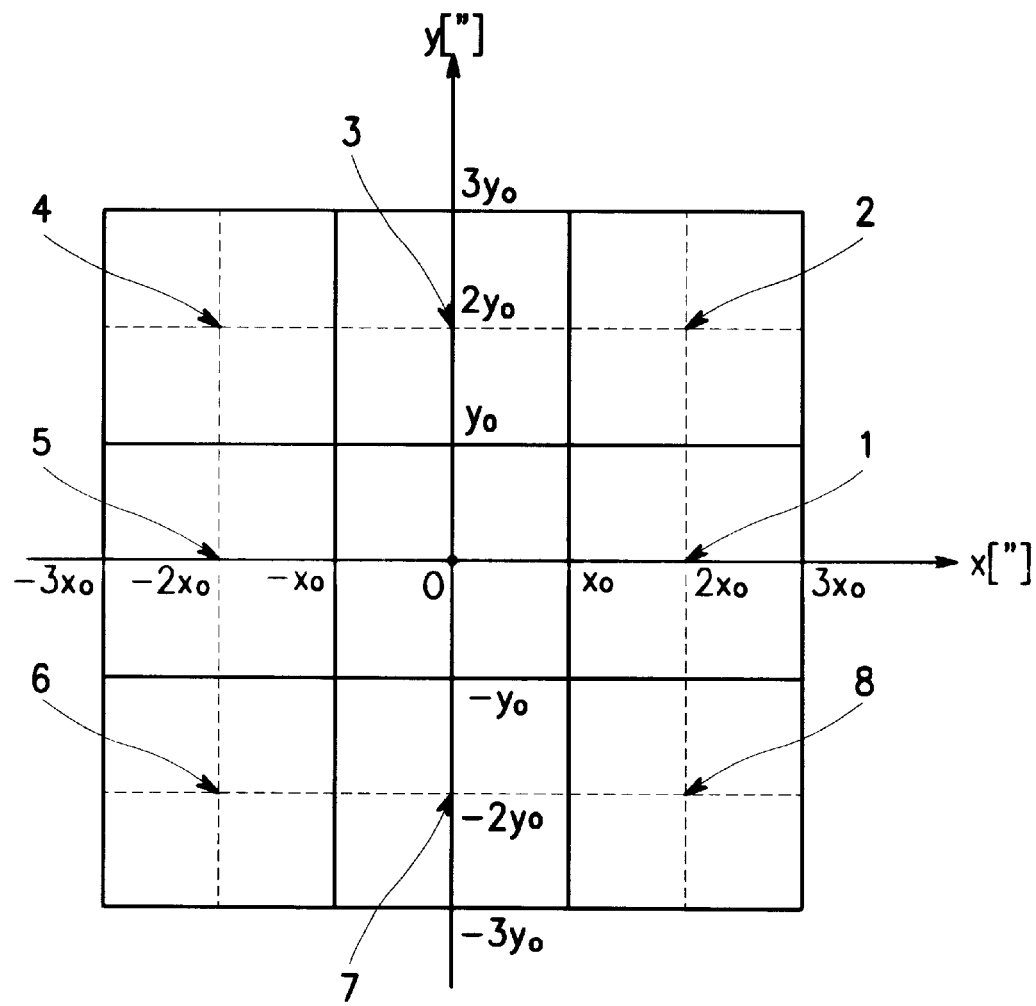
FIG. 2 is a diagram illustrating coordinates of a subscriber and the corresponding bin in which the subscriber is included to assist in the explanation of the present invention.

FIG. 2 illustrates the coordinates of a subscriber and a bin in which the subscriber is located to assist in the explanation of the present invention.

The latitude and the longitude of the bin in which the subscriber is located are mapped into the origin of an (x,y) coordinate axis, as shown in FIG. 2. That is, the coordinates of the bin where the subscriber is located are (0,0). Here, the x-axis indicates the longitude and the y-axis indicates the latitude. The size of each bin is $2x_0 \times 2y_0$ and the coordinate of the subscriber's address is represented by (x,y). Furthermore, the coordinate of other bins is defined as $(2nx_0, 2my_0)$, where "n" and "m" are non-zero integers. It is assumed that there exist 8 bins adjacent to the bin where the subscriber is included. Such eight adjacent bins are illustrated in FIG. 2.

Now, a description will be made relating to a method for fetching a sector list of the adjacent bins from the zone data based on the above conditions.

FIG. 3 illustrates coordinates of 8 bins, as shown in FIG. 2, adjacent to the bin where the subscriber is located.

The table shown in FIG. 3 is used when information about the 8 adjacent bins are all cited (or referred to). That is, this table is used for updating and managing the sector list in a bin unit regardless of the subscriber's position within a bin. More specifically, when the coordinate of the bin where the subscriber is located is determined, the coordinates of the adjacent bins (marked 1 through 8 in FIG. 2) are determined and tabulated as shown in FIG. 3.

FIG. 4 illustrates a bin list used for updating and managing the sector list of a subscriber unit for billing purposes.

The table shown in FIG. 4 illustrates adjacent bin numbers, a maximum of 3 bin numbers, corresponding to each of the eight adjacent bin coordinates. That is, the table 4 is used when updating and managing the sector list of a subscriber unit. When a particular bin is excluded from the sector list due to the fading problem, the position of the mobile subscriber is determined in the particular bin; then, the adjacent bin information will be retrieved as substitute for the missing bin information. As stated in "Remarks" of FIG. 3, the information of the adjacent bins according to the present invention varies depending to the position where the subscriber is located.

As described above, the present invention discloses an alternate way of updating and managing a sector list in the event that a particular sector is excluded from the sector list due to low signal strength of the corresponding PN signal transmitted from a base station. In other words, it is possible to prevent an error in creating a sector list used for different billing purposes in the home zone service. Thus, when a particular bin is excluded from the sector list due to a variation in the radio environments, the present invention provides a means to obtain adjacent bin information so that the excluded bin will have the necessary bin information used for billing purposes in the sector list.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. A method for updating a sector list of a mobile station used for different billing purposes in a home zone service, said method comprising the steps of:

(a) in the event that a sector information at a specified region covered by a base station is unascertainable, determining the position of said mobile station according to a predetermined zone database;

(b) determining a plurality of adjacent sector information relative to the position of said mobile station;

(c) transferring one of said adjacent sector information to said unascertainable sector information; and, (d) updating said sector list of said mobile station using said transferred adjacent sector information.

2. The method of claim 1, wherein said unascertainable sector information is caused by a weak Pseudo Noise (PN) signal strength received by said mobile station at said specified region covered by said base station.

3. The method of claim 1, wherein said step (a) of determining the position of said mobile station is performed using an address information transmitted from said mobile station to look up the corresponding bin data from said predetermined zone database.

4. The method of claim 3, wherein said predetermined zone database includes a latitude and longitude information matching said address information.

5. The method of claim 1, wherein the position of said mobile station is mapped into X-Y coordinates.

6. The method of claim 1, wherein said step (a) of determining the position of said mobile station comprises the steps of:

associating the position of said mobile station in term of a bin position, said bin position defining the boundary of said home zone service;

mapping latitude and longitude of where said mobile station is located into an origin of an (x,y) coordinate axis;

setting the latitude and the longitude to an x-axis and a y-axis, respectively; and, setting a size of said bin to $2x_0 \times 2y_0$.

7. The method of claim 6, wherein said step (b) of determining said plurality of adjacent sector information comprises the step of assigning a plurality of bins surrounding said mobile station within a predetermined distance.

8. The method of claim 6, wherein said step (b) of determining said plurality of adjacent sector information comprises the steps of:

assigning a first adjacent bin having a coordinate $(2x_0, 0)$ on the x-axis with a positive x-axis value;

assigning a second adjacent bin having a coordinate $(2x_0, 2y_0)$, said second bin exists on the first quadrant of the (x,y) coordinate axis;

assigning a third adjacent bin having a coordinate $(0, 2y_0)$, said third bin exists on the y-axis with a positive y-axis value;

assigning a fourth adjacent bin with a coordinate ($-2x_0$, $2y_0$), said forth bin exists on the second quadrant of the (x,y) coordinate axis;

assigning a fifth adjacent bin with a coordinate ($-2x_0$,0), said fifth bin exists on the x-axis with a negative x-axis value;

assigning a sixth adjacent bin with a coordinate ($-2x_0$,$-2y_0$), said sixth bin exists on the third quadrant of the (x,y) coordinate axis;

assigning a seventh adjacent bin with a coordinate (0,$-2y_0$), said seventh bin exists on the y-axis with a negative y-axis value; and, assigning an eighth adjacent bin with a coordinate ($2x_0$,$-2y_0$), said eighth bin exists on the fourth quadrant of the (x,y) coordinate axis.

9. The method of claim 8, wherein said step of (c) transferring one of said adjacent sector information into said sector list comprises the steps of:

fetching information of said first adjacent bin if the bin position of said mobile subscriber is located on the x-axis with a positive x-axis value;

fetching information of one of said first, second and third adjacent bins if the bin position of said mobile subscriber is located on the first quadrant;

fetching information of said third adjacent bin if the bin position of said mobile subscriber is located on the y-axis with a positive y-axis value;

fetching information of one of said third, fourth and fifth adjacent bins if the bin position of said mobile subscriber is located on the second quadrant;

fetching information of said fifth adjacent bin if the bin position of said mobile subscriber is located on the x-axis with a negative x-axis value;

fetching information of one of said fifth, sixth and seventh adjacent bins if the pin position of said mobile subscriber is located on the third quadrant;

fetching information of said seventh adjacent bin if the bin position of said mobile subscriber is located on the y-axis with a negative y-axis value; and fetching information of one of said seventh, eighth, and first adjacent bins if the bin position of said mobile subscriber is located on the fourth quadrant.

10. The method of claim 9, wherein said step (a) of mapping the latitude and longitude where a mobile subscriber is located is performed using a Global Satellite Position System (GPS) software.

11. A method for updating a sector list of a home zone database for a home zone service, comprising the steps of:

(a) mapping latitude and longitude where a mobile subscriber is located into an origin of an (x,y) coordinate axis of a bin;

(b) setting said latitude and said longitude to an x-axis and a y-axis, respectively;

(c) setting a size of said bin to $2x_0 \times 2y_0$;

(d) determining a plurality of adjacent bins surrounding where said mobile subscriber is located;

(e) fetching a sector list information of one of said adjacent bins to update said sector list of said home zone database.

12. The method of claim 11, further comprising the steps of:

setting an address coordinate of said mobile subscriber to (x,y), and setting coordinates of other bins to ($2nx_0$,$2my_0$), wherein "n" and "m" represents non-zero integers.

13. The method of claim 11, wherein said step (e) of fetching said sector list information of said adjacent bins is performed if said bin where said mobile subscriber is located is unable to receive an adequate Pseudo Noise (PN) signal strength from a base station.

14. The method of claim 11, wherein said step (d) of determining said adjacent bins comprises the steps of:

defining a first adjacent bin having a coordinate ($2x_0$,0) on the x-axis with a positive x-axis value;

defining a second adjacent bin having a coordinate ($2x_0$, $2y_0$), said second bin exists on the first quadrant of the (x,y) coordinate axis;

defining a third adjacent bin having a coordinate (0,$2y_0$), said third bin exists on the y-axis with a positive y-axis value;

defining a fourth adjacent bin with a coordinate ($-2x_0$, $2y_0$), said forth bin exists on the second quadrant of the (x,y) coordinate axis;

defining a fifth adjacent bin with a coordinate ($-2x_0$,0), said fifth bin exists on the x-axis with a negative x-axis value;

defining a sixth adjacent bin with a coordinate ($-2x_0$,$-2y_0$), said sixth bin exists on the third quadrant of the (x,y) coordinate axis;

defining a seventh adjacent bin with a coordinate (0,$-2y_0$), said seventh bin exists on the y-axis with a negative y-axis value; and, defining an eighth adjacent bin with a coordinate ($2x_0$,$-2y_0$), said eighth bin exists on the fourth quadrant of the (x,y) coordinate axis.

15. The method of claim 14, wherein said step (e) of fetching said sector list information of said adjacent bins to update said sector list comprises the steps of;

fetching information of said first adjacent bin if the bin position of said mobile subscriber is located on the x-axis with a positive x-axis value;

fetching information of one of said first, second and third adjacent bins if the bin position of said mobile subscriber is located on the first quadrant;

fetching information of said third adjacent bin if the bin position of said mobile subscriber is located on the y-axis with a positive y-axis value;

fetching information of one of said third, fourth and fifth adjacent bins if the bin position of said mobile subscriber is located on the second quadrant;

fetching information of said fifth adjacent bin if the bin position of said mobile subscriber is located on the x-axis with a negative x-axis value;

fetching information of one of said fifth, sixth and seventh adjacent bins if the pin position of said mobile subscriber is located on the third quadrant;

fetching information of said seventh adjacent bin if the bin position of said mobile subscriber is located on the y-axis with a negative y-axis value; and fetching information of one of said seventh, eighth, and first adjacent bins if the bin position of said mobile subscriber is located on the fourth quadrant.

* * * * *